(12) United States Patent
Haapanen

(10) Patent No.: US 9,807,254 B2
(45) Date of Patent: Oct. 31, 2017

(54) SYSTEM, APPARATUS AND METHOD CONFIGURED TO DETECT, ANALYZE AND/OR REPORT IMPACT TO OUTPUT DEVICE

(71) Applicant: Tom Haapanen, Kichener (CA)

(72) Inventor: Tom Haapanen, Kichener (CA)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/088,901

(22) Filed: Apr. 1, 2016

(65) Prior Publication Data

US 2017/0289364 A1    Oct. 5, 2017

(51) Int. Cl.
    *G06F 3/12*    (2006.01)
    *H04N 1/00*    (2006.01)
    *G01P 15/00*   (2006.01)

(52) U.S. Cl.
    CPC ....... *H04N 1/00079* (2013.01); *G01P 15/001* (2013.01); *H04N 1/0009* (2013.01); *H04N 1/00015* (2013.01); *H04N 1/00037* (2013.01); *H04N 1/00058* (2013.01); *H04N 1/00076* (2013.01); *H04N 2201/0094* (2013.01)

(58) Field of Classification Search
    CPC ........... H04N 1/00079; H04N 1/00015; H04N 1/00037; H04N 1/00058; H04N 1/00076; H04N 1/0009; H04N 2201/0094; G01P 15/01
    USPC ....................................................... 358/1.15
    See application file for complete search history.

(56) References Cited

U.S. PATENT DOCUMENTS

| | | | | |
|---|---|---|---|---|
| 5,678,144 A * | 10/1997 | Osaki | ................ | G03G 15/5008 399/159 |
| 6,178,009 B1 * | 1/2001 | Yamada | ................ | B41J 2/2107 347/15 |
| 8,891,106 B1 | 11/2014 | Haapanen | | |
| 9,122,433 B2 | 9/2015 | Haapanen | | |
| 9,130,838 B2 | 9/2015 | Anderson et al. | | |
| 2001/0055507 A1 * | 12/2001 | Tobita | ........................ | B41J 2/30 400/76 |
| 2002/0172227 A1 * | 11/2002 | Varelas | .................. | H04J 3/1611 370/514 |
| 2003/0206224 A1 * | 11/2003 | Sakakibara | ............... | B41J 29/13 347/108 |
| 2006/0269339 A1 * | 11/2006 | Okamoto | ........... | G03G 15/6564 399/401 |
| 2012/0265865 A1 | 10/2012 | Tanaka et al. | | |
| 2012/0266073 A1 | 10/2012 | Tanaka et al. | | |

(Continued)

OTHER PUBLICATIONS

U.S. Appl. No. 14/735,251 of Tom Haapanen et al., filed Jun. 10, 2015.

(Continued)

*Primary Examiner* — Allen H Nguyen
(74) *Attorney, Agent, or Firm* — Cooper & Dunham LLP

(57) ABSTRACT

Systems, apparatuses and methods are provided to allow for detection of an impact to an output apparatus. Such impact may be caused by a sudden force applied to one or more points on the apparatus housing or another part of the apparatus accessible from outside the apparatus housing. An impact detector outputs to an apparatus controller an impact report including impact time and impact data corresponding to the detected impact event.

10 Claims, 12 Drawing Sheets

(56) References Cited

U.S. PATENT DOCUMENTS

2014/0222980 A1     8/2014   Hagiwara et al.
2014/0223325 A1     8/2014   Melendez et al.

OTHER PUBLICATIONS

U.S. Appl. No. 14/926,978 of Tom Haapanen et al., filed Oct. 29, 2015.
U.S. Appl. No. 14/934,093 of Tom Haapanen et al., filed Nov. 5, 2015.
U.S. Appl. No. 15/015,619 of Tom Haapanen et al., filed Feb. 4, 2016.

* cited by examiner

| Impact Reports |||| 
|---|---|---|---|
| Impact Report | Impact Event | Impact Time | Did malfunction precede the impact? |
| 1 | Feed tray closed violently | 9:00:01 AM | Yes |
| 2 | Impact to fragile components at operational panel | 10:15:40 AM | No |
| 3 | Impact detected at display panel | 3:05:11 PM | No malfunction |

Fig. 7

| Impact Reports ||||
|---|---|---|---|
| Impact Report | Impact Event | Impact Time | Did malfunction precede the impact? |
| 4 | Feed tray closed violently | 9:05:33 AM | Yes |
| 5 | Impact to lower side detected | 9:05:36 AM | Yes |
| 6 | Impact detected at upper front location | 9:05:38 PM | Yes |

Fig. 8

SYSTEM, APPARATUS AND METHOD CONFIGURED TO DETECT, ANALYZE AND/OR REPORT IMPACT TO OUTPUT DEVICE

TECHNICAL FIELD

This disclosure relates to tools (such as systems, apparatuses, methodologies, computer program products, etc.) configured to detect impact to an output device, and more specifically, tools that detect, analyze and/or report one or more impact events when the impact exceeds a threshold.

BACKGROUND

In the current information age, information technology (IT) tools play a significant role in our daily activities, and there are often discussions of the desirableness of a paperless society. However, notwithstanding such discussions, there remains a need by users of computers and other information terminals (that is, any of the various conventional devices which may have a need to print on demand, such as personal computers, notebook computers, workstations, other types of computers, kiosks, PDAs, other information appliances, etc.) for printing functionality. Therefore, output devices having printing or plotting functionality, such as printers, copiers, multi-function peripheral (MFP) devices, etc., continue to play a significant role at home, at work and even elsewhere.

More recently, such output devices are configured for device administrators and/or vendors to monitor settings, parameters and counters internal to the device. However, as such output devices become a more integral part of the work environment, maintenance of such equipment remains a challenge and there is a continuing need to improve equipment design and configuration to optimize equipment durability and on-line time.

There remains a need for an improved approach to detect user actions and environmental impacts on output devices, and utilize such information to improve maintenance and functioning of the devices, and to determine and address issues that affect proper functioning of the devices.

SUMMARY

Various tools (for example, a system, an apparatus, application software, etc.) can be configured to detect an impact event, meeting a minimum impact criteria, to an output device. Such tools facilitate a new process of monitoring user and environmental impacts on such devices. That is, the tools disclosed herein allow for the detection of such an impact event caused by user action or other impact-causing objects in an operating environment. An impact report corresponding to the impact event may be processed to obtain information for devising corrective actions, to address any current or prospective issues.

In an aspect of this disclosure, an output apparatus is configured to include one or more impact detectors to detect an impact event that meets a minimum impact criteria. For example, the minimum impact criteria may be met when there is a specified amount of acceleration change over a predetermined amount of time, and such acceleration change may be caused by a sudden force applied to one or more points on the apparatus housing. The impact detector can then output to an apparatus controller, which controls the operation of the output apparatus, an impact report including impact time and impact data corresponding to the detected impact event.

In another aspect, the impact detector may compare the detected impact to the minimum impact criteria, and in a case that the impact does not meet the minimum impact criteria, the impact detector does not consider the impact to be an impact event. On the other hand, if the impact does exceed the minimum impact criteria, the impact data is provided to the apparatus controller.

In another aspect, an impact assessment device may be provided to analyze one or more impact reports obtained by the apparatus controller, in order to determine one or more prospective problems corresponding to the impact events reported in the impact reports. More specifically, the impact assessment device may be provided to determine whether corrective actions are necessary to address said problems, and to cause such actions to be performed if necessary.

A monitoring system may include one or more impact detectors suitably provided to an output apparatus to detect significant impact data corresponding to force applied by a user or object in the operating environment, to the output apparatus, and the impact detectors may be disposed in various locations of the apparatus and/or housing, to monitor as much of the apparatus and/or housing, as desired. Such a system may be configured to notify a system administrator or service contact whenever significant impact to the apparatus (including, e.g., any fragile or expensive components thereof) occurs. Since the cause of a malfunction may be readily determined, and the output apparatus can be quickly repaired to keep the apparatus functioning properly.

BRIEF DESCRIPTION OF THE DRAWINGS

The aforementioned and other aspects, features and advantages can be more readily understood from the following detailed description with reference to the accompanying drawings wherein:

FIG. 7 shows an example of information that can included in an impact report in any of the systems of FIGS. 1A, 1B, 2A and 2B (or an equivalent);

FIG. 8 shows another example of information that can included in an impact report in any of the systems of FIGS. 1A, 1B, 2A and 2B (or an equivalent);

DETAILED DESCRIPTION OF EMBODIMENTS

Figure 1A:
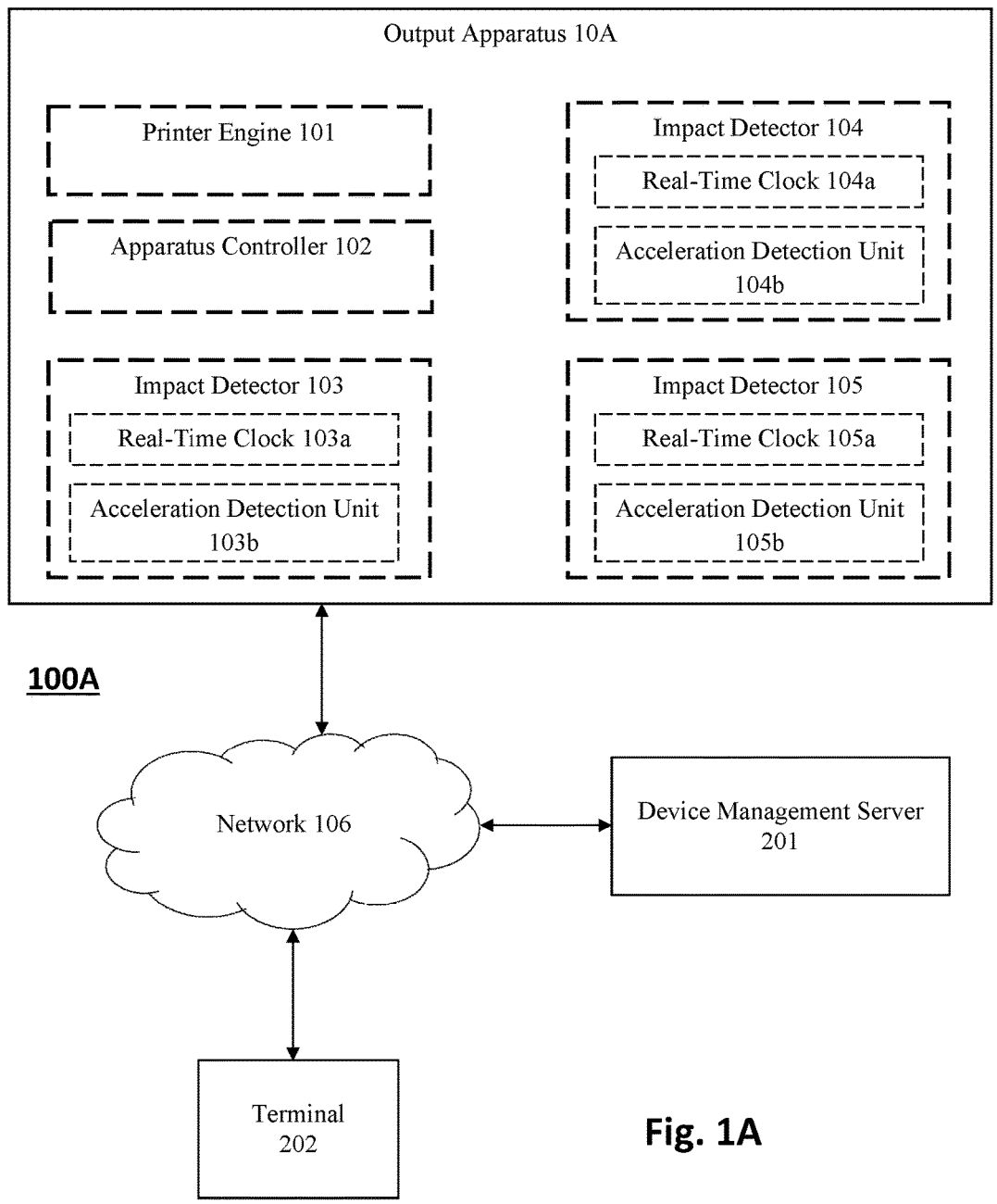
FIG. 1A shows a block diagram of a system for detecting an impact event as a result of a force being applied to an output apparatus, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations is omitted when it may obscure the subject matter of the present invention. Referring now to the drawings, wherein like reference numerals designate identical or corresponding parts throughout the several views, there are described tools (systems, apparatuses, methodologies, computer program products, etc.) for detecting an impact event that occurs when a force is applied to an output apparatus.

FIG. 1A shows schematically a system 100A in which an output apparatus 10A configured to include a printer engine 101, an apparatus controller 102 and impact detectors 103, 104 and 105 is connected to network 106, as are a device management server 201 and a terminal 4 Although only one terminal 101 is shown in FIG. 1A, it should be understood that the system 100A can include a plurality of terminal devices (which can have similar or different configurations). Likewise, although only one output apparatus 10A is shown in FIG. 1A, there may be multiple output apparatuses (having similar or different configurations) in the system 100A.

The terminal 202 can be any computing device, including but not limited to a personal, notebook, tablet or workstation computer, a mobile phone or handset, another information terminal, etc., that can communicate with other devices through the network 106. The terminal 202 is further described infra with reference to FIG. 3.

The device management server 201 is configured to communicate with each of various managed devices, such as output apparatus 10A, to obtain information regarding the status of the managed device. The device management server 201 may also transmit notifications to, and/or otherwise communicate via the network 106 with, terminal 202. For example, an authorized user employing the terminal 202 may access the device management server 201 to obtain device data collected and/or maintained by the device management server 201. The device management server 201 is further described infra with reference to FIG. 2.

Figure 5:
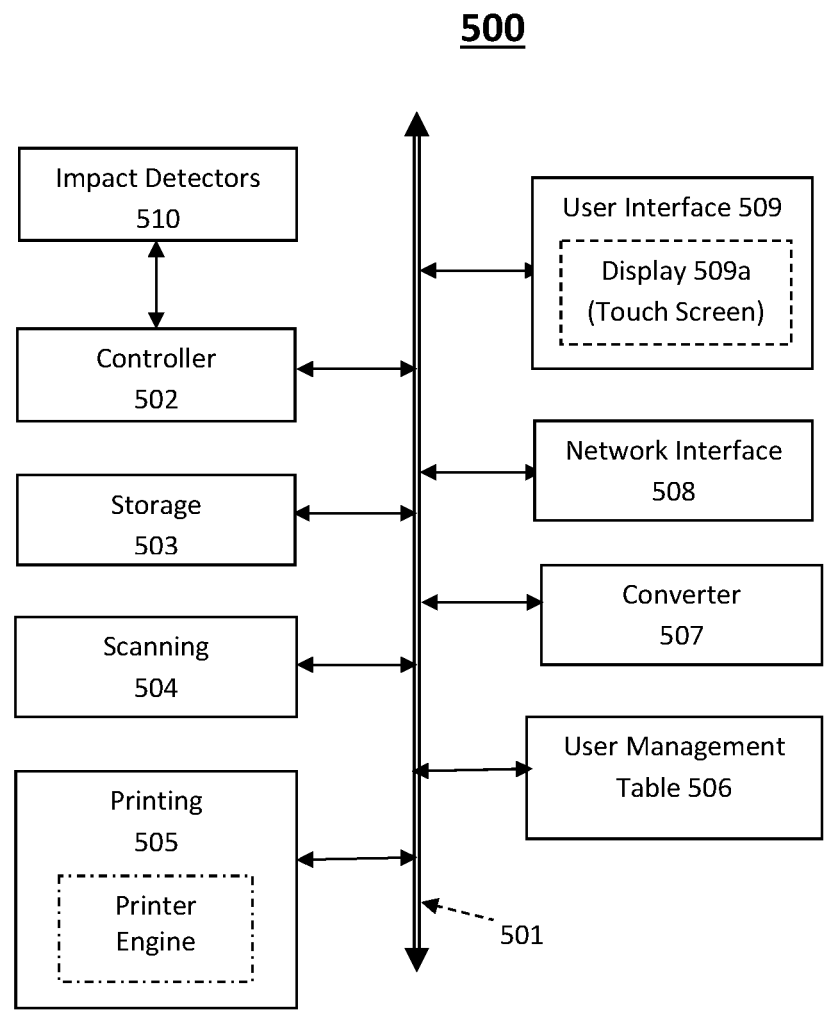
FIG. 5 shows a block diagram of an example of a configuration of a multi-function device.

The output apparatus 10A can be, for example a printer/scanner, printer/scanner/fax, etc. Ideally, the output apparatus 10A contains all of the above-mentioned functions, but may not necessarily be allowed to perform the functions immediately. For example, the output apparatus 10A may have a plurality of inactive software which corresponds to a different set of functions (copying, printing, scanning, faxing). Authorization from an external device may be required before the output apparatus 10A can perform such functions. While this example of this disclosure simply refers to a single output apparatus 10A in the interest of brevity, it should be appreciated that the network environment can have an arbitrary number of output apparatuses 10A. The output apparatus 10A may be configured as shown in FIG. 5, which is discussed infra.

The output apparatus 10A may include an operational panel (i.e. at impact detector 607 in FIG. 5) which allows the user to access various functions on the output apparatus 10A. For example, the user may operate the operational panel on the output apparatus 10A to copy a document, scan a photo, print from a PC or fax to another country. Such access to the functions in the output apparatus 10A may require the user to input user credentials through a user interface. The user interface may include a graphical user interface through which the user enters username, password, etc. However, user credentials may alternatively or additionally include other information. For example, the user interface may include, or may be integrated with, components for speech processing, voice recognition, fingerprint scanning, facial recognition, retina scanning, other forms of biometric authentication, etc. In addition, the user may also have to present an activation code before accessing the functions of the output apparatus 10A. The activation code may be in the form of the user credentials inputted earlier. However, the activation code may also include inputting an alphanumeric sequence, swiping an ID card, etc. Such components, like the user interface, can include a combination of software and hardware components. Since such provisions are well known in the art, and do not form an inventive aspect of this disclosure, details thereof are not provided herein in order to avoid obscuring the inventive aspects of this disclosure.

The output apparatus 10A further includes a printer engine 101 which is a combination of firmware and hardware that allows the output apparatus 10A to perform a function (copying, printing an image on a recording medium, scanning, faxing, etc.). While only one printer engine 101 is shown in FIG. 1A in the interest of brevity, it should be appreciated that the output apparatus 10A can have an arbitrary number of printer engines 101. For example, one type of printer engine 101 can be used for copying files, while another type of printer engine 101 can be used for faxing documents. Further, software can be used to cause the printer engine 101 to perform and configure the functions. For example, the output apparatus 10A may contain a capability for scanning documents, but users are not able to access that function until software for scanning is installed onto the printer engine 101. Further, even if the output apparatus 10A contained the software for scanning, users may still not be able to access it. For example, the printer engine 101 may have to receive authorization from an external device before giving the user the privilege of scanning.

Printer engine 101 is otherwise conventional, and therefore, a detailed description of such conventional aspects is omitted in the interest of clarity and brevity.

The apparatus controller 102 controls the operation of the output apparatus 10A, and may be connected to the impact detectors 103, 104 and 105 via a data connection such as USB, serial, Ethernet or another similar interface such that apparatus controller 102 receives impact data reports that are output from the impact detectors 103, 104, 105. The apparatus controller 102 is further described infra with reference to FIG. 5.

Each of the impact detectors 103, 104, 105 may be disposed within or on a housing of the output apparatus 10A, and each impact detector may be an accelerometer, a gyro or similar device configured to detect an impact event that meets a minimum impact criteria. Such impact events include impacts made on the output apparatus 10A by end users or other environmental actors, such as other staff, equipment, or furniture, and such detected impacts may be used in the collection and analysis of impact data (i.e. to determine how such impact data correlates with device statuses and device problems). The minimum impact criteria includes a specified amount of acceleration change that occurs over a predetermined amount of time.

Each of the impact detectors 103, 104 and 105 may include a real-time clock (i.e. 103a, 104a, 105a) and an acceleration detection unit (i.e. 103b, 104b, 105b), respectively. The real-time clock 103a, 104a, 105a may be used to maintain the current date and time so as to keep the impact detector synchronized with apparatus controller 102. More specifically, when the impact detector 103, 104, 105 is on-line (i.e. the apparatus controller 102 is responsive to the impact detector 103, 104, 105), the apparatus controller 102 may set the date and time of the real-time clock 103a, 104a, 105a of the impact detector 103, 104, 105. The acceleration detection unit 103b, 104b, 105b detects a change in acceleration of the impact detector that may be caused by sudden force applied to one or more points on the housing of the output apparatus 10A, or on another part of the apparatus accessible from outside of the apparatus housing. Each of the impact detectors 103, 104, 105 detects an impact event that meets a minimum impact criteria, which is a specified amount of acceleration change over a predetermined amount of time, and outputs to the apparatus controller 102 an impact report which includes impact time and impact data corresponding to the detected impact event.

Although power may be supplied to the impact detector 103, 104, 105 via a power supply of the output apparatus 10A, a secondary battery may also be utilized to provide power for the real-time clock 103a, 104a, 105a and other components of the impact detector 103, 104, 105 in the absence of the power supply. The battery may be a conventional battery or a rechargeable battery that is chargeable from the power supply of the output apparatus 10A.

Figure 1B:
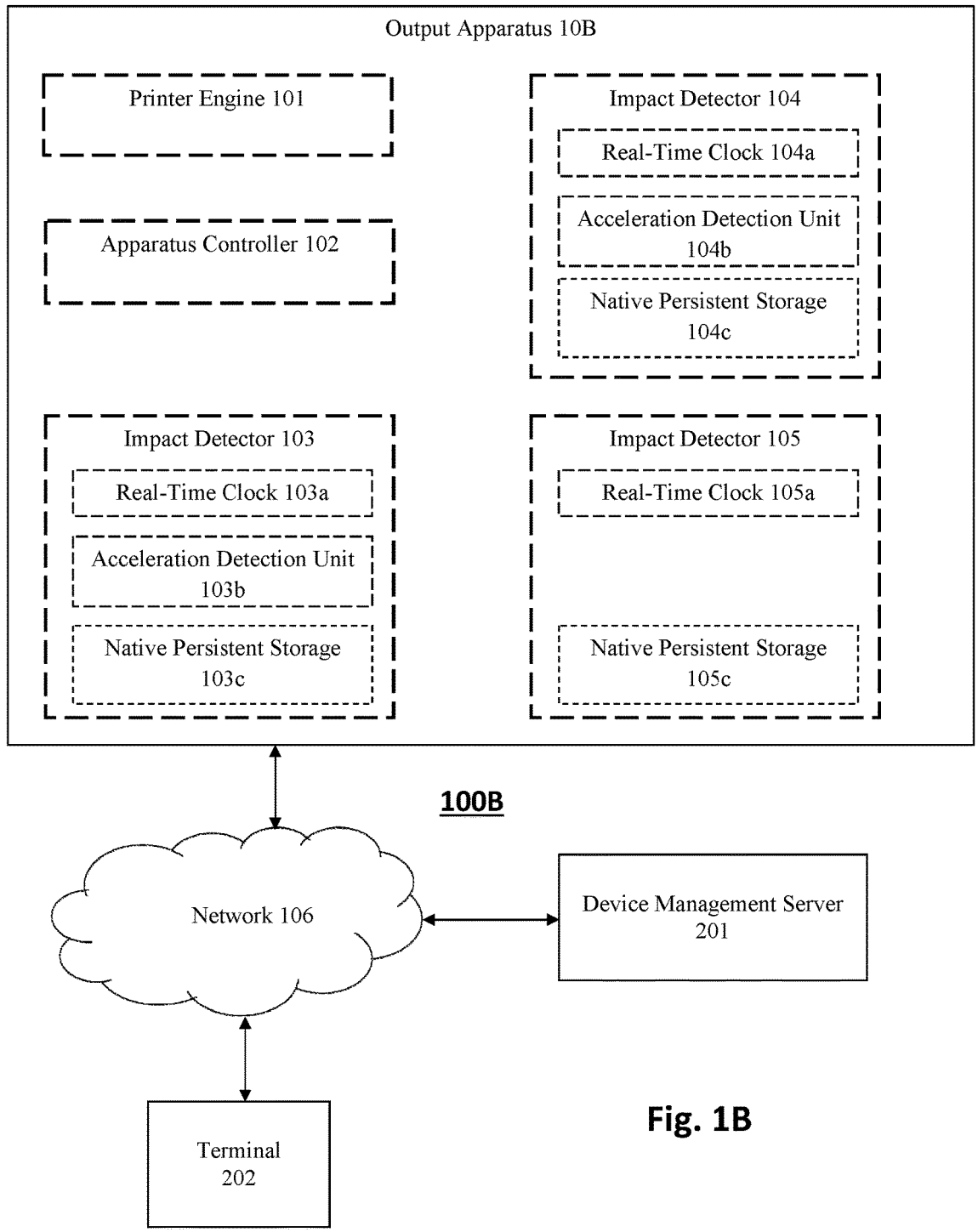
FIG. 1B shows a block diagram of a system for a block diagram of a system for detecting an impact event as a result of a force being applied to an output apparatus, according to another exemplary embodiment.

FIG. 1B shows schematically a system 100B, according to another exemplary embodiment. The system 100B is similar to the system 100A except that each impact detector 103, 104 and 105 of output apparatus 10B additionally includes native persistent storage 103c, 104c and 105c, respectively. Such persistent storage 103c, 104c and 105c may be flash memory that is configured to capture and store impact time and impact data corresponding to the detected impact event even when power is not supplied by the power supply of the output apparatus 20 to the impact detector 103, 104, 105.

The impact detector 103, 104, 105 may determine whether the impact detector 103, 104, 105 is off-line (i.e. the apparatus controller 102 is not responsive to the impact detector 103, 104, 105) or whether the impact detector 103, 104, 105 is on-line (i.e. the apparatus controller 102 is responsive to the impact detector 103, 104, 105). When impact occurs while the impact detector 103, 104, 105 is off-line, the impact detector 103, 104, 105 may store the impact time and impact data in the native persistent storage 103c, 104c, 105c until the impact detector 103, 104, 105 is back on-line, at which point the impact detector 103, 104, 105 retrieves the stored impact time and impact data from the native persistent storage 103c, 104c, 105, and generates and outputs the impact report to the apparatus controller 102.

Further, the native persistent storage 103c, 104c, 105c of impact detector 103, 104, 105, respectively, may store data and settings even when power is not supplied by the power supply of the output apparatus 20 to the impact detector 103, 104, 105. In such a circumstance, minimum impact criteria may be obtained from the apparatus controller 102 by the impact detector 103, 104, 105 upon request of the impact detector. Alternatively, minimum impact criteria may be obtained via the apparatus controller 102 pushing the minimum impact criteria onto the impact detector 103, 104, 105 and the impact detector 103, 104, 105 storing the minimum impact criteria in the native persistent storage 103c, 104c, 105c of the impact detector.

The output apparatus 10B may be configured such that when the impact detector 103, 104, 105 detects an impact, the impact detector 103, 104, 105 compares the impact to the minimum impact criteria set to the impact detector 103, 104, 105. After performing this comparison, the impact detector may output the impact data corresponding to the detected impact event to the apparatus controller 102 only if the impact exceeds the minimum impact criteria. Otherwise, if the impact does not meet the minimum impact criteria, the impact detector 103, 104, 105 does not consider the impact to be an impact event, and thus does not output any impact data. This comparison may occur even if the impact detector is offline (i.e. the apparatus controller 102 is not responsive to the impact detector 103, 104, 105).

Figure 2A:
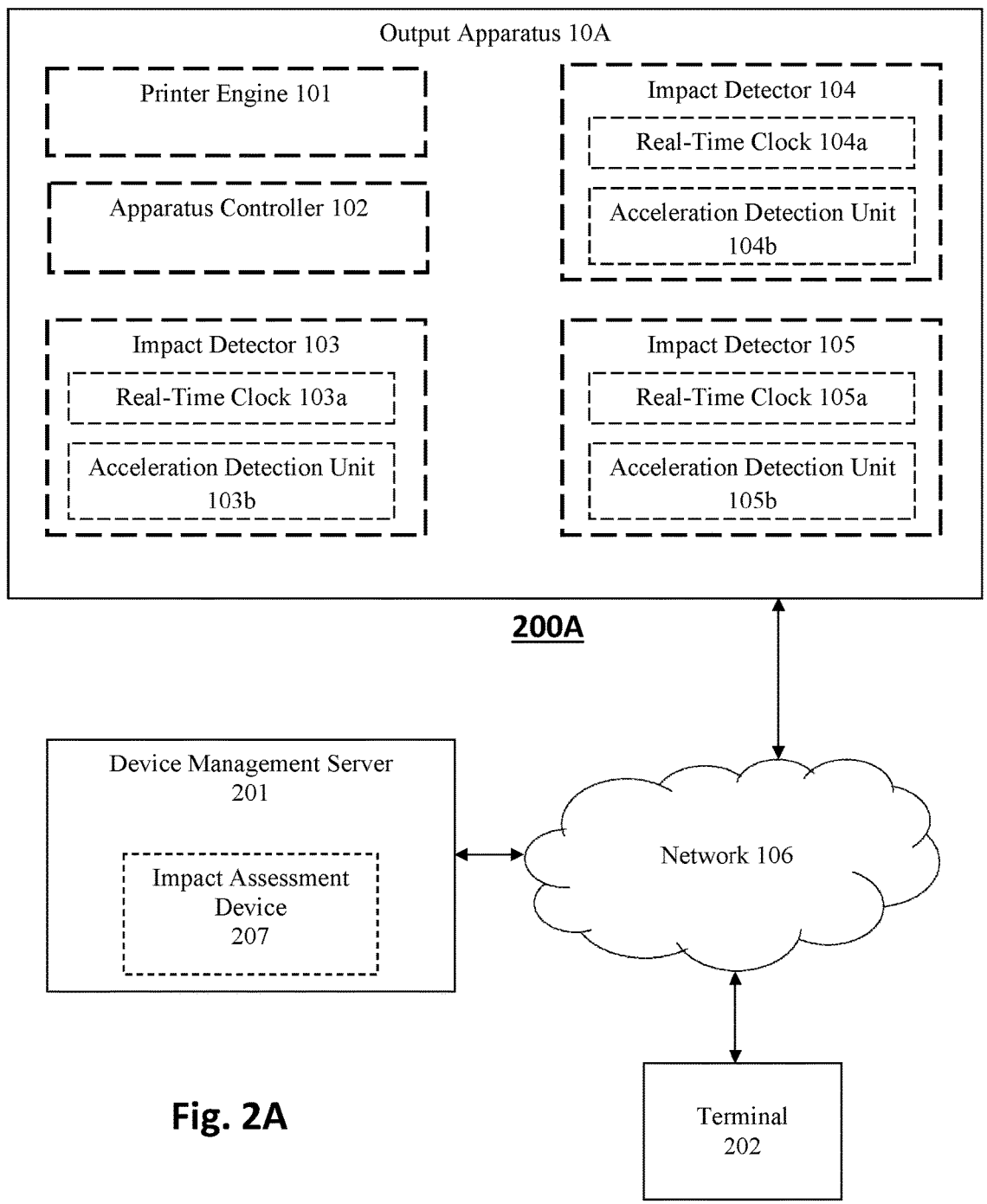
FIG. 2A shows a block diagram of a system for detecting an impact event as a result of a force being applied to an output apparatus, according to another exemplary embodiment.

FIG. 2A shows schematically a maintenance system 200A, according to another exemplary embodiment. The system 200A is similar to the system 100A except that the device management server 201 is configured to operate as, or to include, impact assessment device 207. The apparatus controller 102 collects the impact data and communicates the collected data through the network to the impact assessment device 207.

Figure 2B:
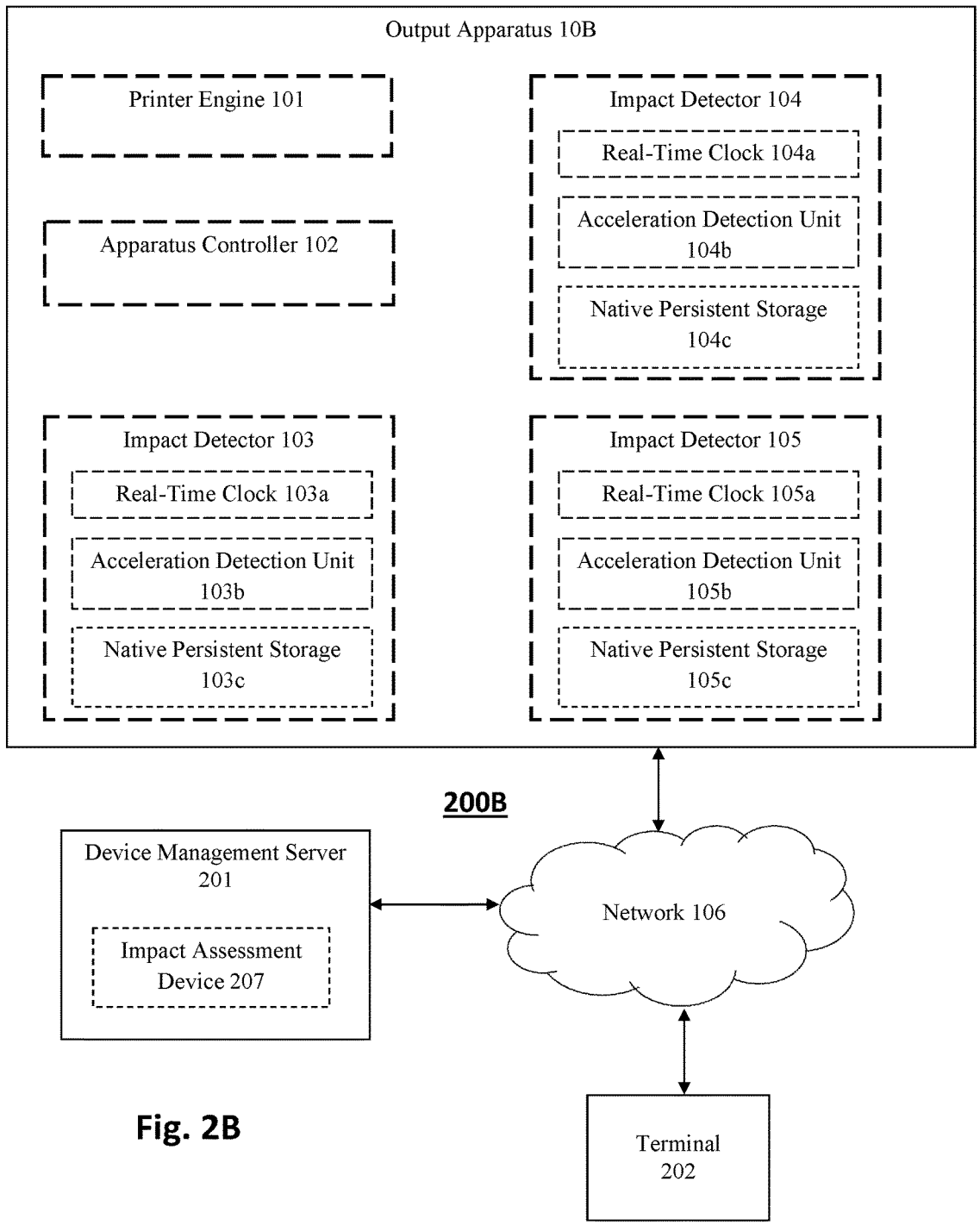
FIG. 2B shows a block diagram of a system for detecting an impact event as a result of a force being applied to an output apparatus, according to another exemplary embodiment.

Similarly, FIG. 2B shows schematically a maintenance system 200B, according to another exemplary embodiment. The system 200B is similar to the system 100B of FIG. 1B except that the device management server 201 is configured to operate as, or to include, impact assessment device 207 and the apparatus controller 102 collects the impact data and communicates the collected data through the network to the impact assessment device 207.

Impact assessment device 207 communicates with apparatus controller 102 of the output apparatus 10A to collect one or more impact reports obtained by the apparatus controller 102 from the impact detectors 103, 104, 105 of the output apparatus 10A, and performs an analysis of the collected impact reports. The impact assessment device 207 may perform such analysis to determine whether there are any prospective problems corresponding to the impact events reported in the impact reports. If it is determined that any problems exist in the output apparatus 10B, the impact assessment device may then determine whether any corrective or remedial actions directed to said problems is necessary, and if so, the impact assessment device 207 may cause such corrective or remedial actions to be performed. Impact assessment device 207 may, either on demand or on a scheduled basis, request the data for any impacts stored by the apparatus controller 102. The impact assessment device 207 may optionally request the apparatus controller 102 to delete impact data once such data has been received by the impact assessment device 207.

In the case where the impact assessment device 207 receives a report of malfunction of an apparatus unit or apparatus part of the output apparatus 10B, the impact assessment device 207 may determine that the reported malfunction is a result of one or more reported impact events at the apparatus unit or apparatus part. The impact assessment device 207 may then transmit a notification (by e-mail, SMS, voice message, etc.) to request that the apparatus unit or apparatus part be replaced. Since the apparatus controller 102 may notify the impact assessment device 207 immediately of these reported impacts (via SNMP, HTTP, or the like), the impact assessment device may then immediately notify a system administrator or manufacturer who supplied the output apparatus 10B, thereby enabling quick and appropriate action to deal with the malfunction.

Figure 6:
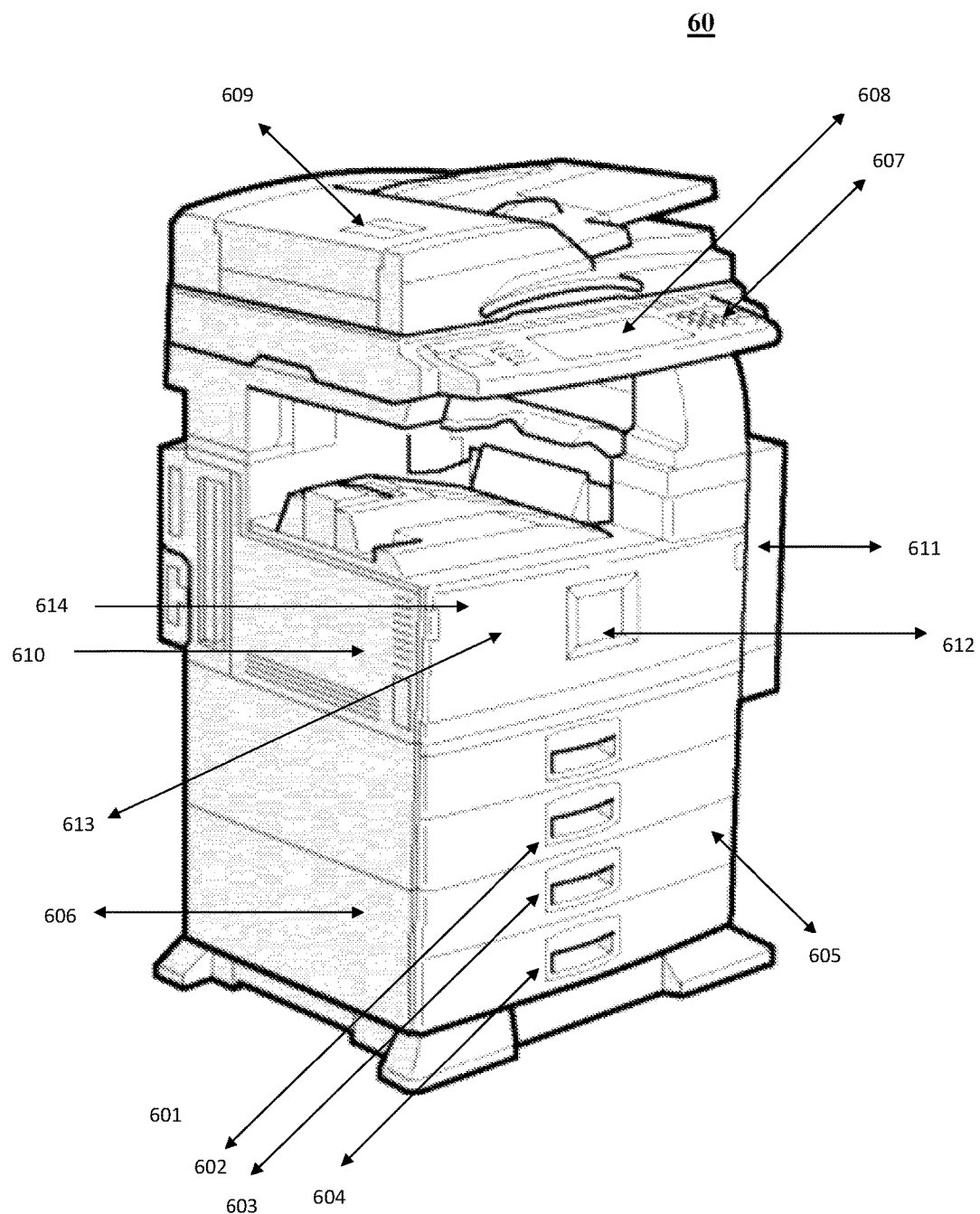
FIG. 6 shows an example of locations of impact detectors on or within a housing of an output apparatus.

In another aspect, the impact assessment device 207 may determine that a number of reported impacts at a consumables area (i.e. at impact detector 614 in toner area of output apparatus 60 in FIG. 6) of the output apparatus 10B over a predetermined period of time exceeds a predetermined threshold number and that a consumables level has not changed over such predetermined amount of time that immediately precedes the determination. In such a case, the impact assessment device may transmit an alert to request an administrator or maintenance service to check the consumables area of the output apparatus 10A.

Otherwise, operations of the elements of system 200A and system 200B are similar to those discussed in connection with the corresponding elements of the system 100A of FIG. 1A and system 100B of FIG. 1B, respectively.

Figure 3:
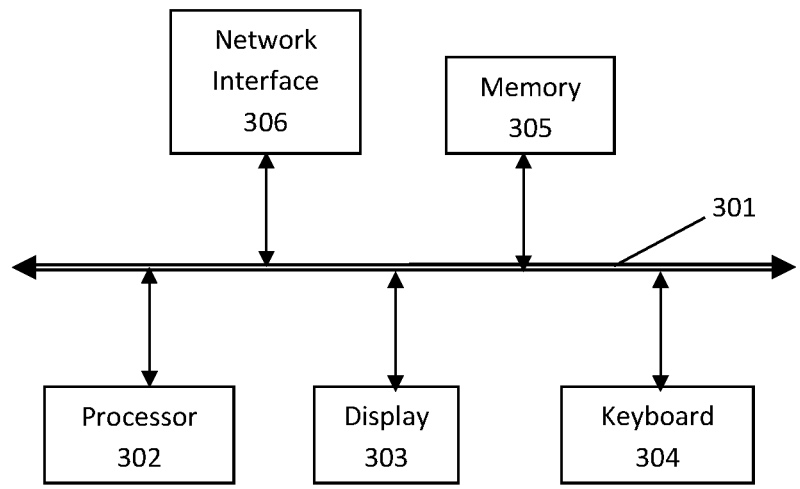
FIG. 3 shows a block diagram of an example of a configuration of a computing device that can be configured by software to operate as a device management server.

FIG. 3 shows an exemplary constitution of a computer 300 that can be configured (for example, through software) to operate (at least in part) as a device management server, such as in any of the systems shown in FIGS. 1A and 1B and FIGS. 2A and 2B (including impact assessment device 207). As shown in FIG. 3, a processor (or central processing unit) 302 communicates with a number of other components, including display 303, keyboard 304, memory or storage part 305 and network interface 306, by way of a system bus 301. The computing device 300 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

Additional aspects or components of the computing device 300 may be conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
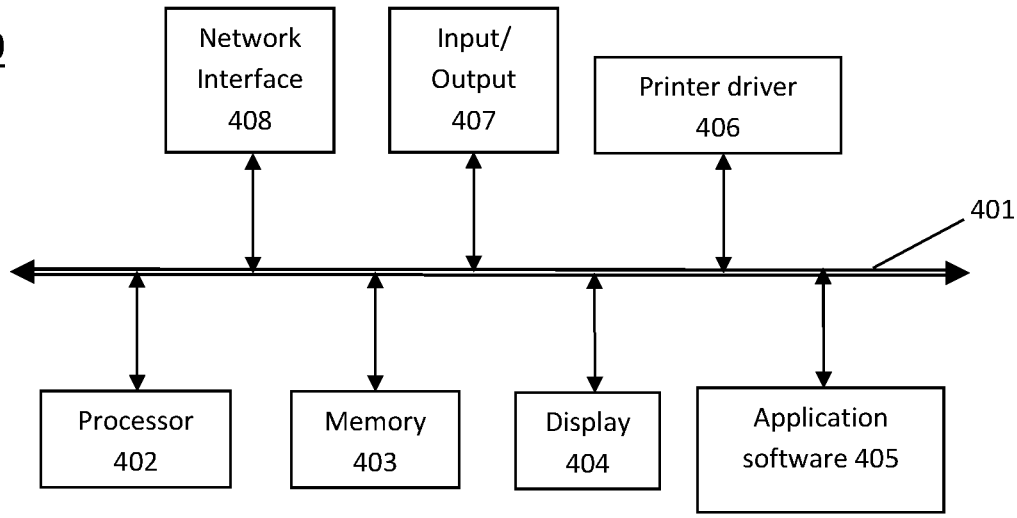
FIG. 4 shows a block diagram of an example of a configuration of a terminal or terminal apparatus.

FIG. 4 shows an exemplary constitution of a terminal that may send a print job to output apparatus 10A, 10B, and/or may communicate with a device management server. In FIG. 4, terminal 400 includes a processor (or central processing unit) 402 that communicates with a number of other components, including memory 403, display 404, application (e.g., device management client) software 405, print driver 406, input/output (such as mouse, keyboard, touchpad, stylus, microphone and/or speaker with voice/speech interface and/or recognition software, etc.) 407 and network interface 408, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 408 provides a connection (for example, by way of an Ethernet connection or other network connection which supports any desired network protocol such as, but not limited to TCP/IP, IPX, IPX/SPX, or NetBEUI) to the network to which the computer 400 is connected (e.g. network 106 of FIG. 1A).

The application software 405 and the print driver 406 are shown as components connected to the internal bus 401, but in practice are typically stored in storage media such as a hard disk or portable media, and/or received through the network, and loaded into memory 403 as the need arises.

Additional aspects or components of the computer 400 may be conventional (except as discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 5 shows a schematic diagram of a configuration of an output device as an MFP (multi-function printer or multi-function peripheral), which can be any apparatus (including a microprocessor chip or a collection of devices having varying degree of integration) that has the ability to perform two or more functionalities.

The MFP 500 shown in FIG. 5 includes a controller 502, and various elements connected to the controller 502 by an internal bus 501. The controller 502, which can be configured (for example, through software) to operate (at least in part) as the apparatus controller 102 of FIGS. 1A, 1B, 2A and 2B, controls and monitors operations of the MFP 500. The elements connected to the controller 502 include storage 503 (for example, random access memory, read-only memory, hard disk drive, portable storage media drive such as for optical discs, magnetic discs, magneto optical discs, etc., semiconductor memory cards, combinations of storage media, etc.), scanning 504, printing 505, a user management table 506, a converter 507, a network interface (I/F) 508, a user interface 509 and impact detectors 510 (connected directly to the controller 502, as shown, or via the bus 501).

Storage 503 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 503 and executed by the controller 502 to carry out the instructions. Such instructions can include instructions for performing specified functions (such as printing, scanning, faxing, copying, e-mailing, etc.) of the MFP 500, to enable the MFP 500 to interact with a terminal, as well as perhaps other external devices, through the network interface 508, and interactions with users through the user interface 509.

The network interface 508 is utilized by the MFP 500 to communicate with other network-connected devices such as a terminal, a software authorization apparatus (e.g. the impact assessment device 207 of FIGS. 2A and 2B) or a software supplying apparatus and receive data requests, print jobs, user interfaces, and etc.

The user interface 509 includes one or more electronic visual displays that display, under control of controller 502, information allowing the user of the MFP 500 to interact with the MFP 500. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 500, so as to allow the operator to interact conveniently with services provided on the MFP 500, or with the MFP 500 serving as terminal for accessing electronic data or other content through the network. User interfaces or other contents received through the network via the network interface 508 can be displayed on the display screen.

The display screen does not need to be integral with, or embedded in, a housing of the MFD 500, but may simply be coupled to the MFD 500 by either a wire or a wireless connection. The user I/O 509 may include keys and/or buttons (such as graphical keys or buttons, or other graphical elements, of a GUI on a touchscreen display) for inputting information or requesting various operations. Alternatively, the user I/O 509 and the display screen may be operated by a keyboard, a mouse, a remote control, voice recognition (e.g., through a speaker/microphone 509*a*), or eye-movement tracking, or a combination thereof.

Since the MFD 500 is typically shared by a number of users, and is typically stationed in a common area, the MFD 500 preferably prompts the user to supply login credentials or authentication information, such as user name (or other user or group information), password, access code, etc. The user credentials can be compared to data stored in the user management table 506 to confirm that the user is authorized to use the MFD 500. The user credentials may also be stored for the session and automatically supplied if access to other devices through the network requires it. On the other hand, such other devices may prompt the user to supply other user credentials through the user interface.

Other methods of authentication may also be used. For example, the MFD 500 may be equipped with a card reader or one or more biometrics means (such as comparing fingerprints, palm prints, voice or speech, retinas or irises, facial expressions or features, signature, etc.).

The MFD 500 may communicate the user credentials, provided in the manners discussed above, to other devices or applications connected to the MFD 500 via a network (e.g., the network 106 of FIG. 1A) for determining authorization for performing jobs.

Scanning 504, printing 505, and network interface 508 are otherwise conventional, and therefore, a detailed description of such conventional aspects is omitted in the interest of clarity and brevity.

The MFP 500 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

FIG. 6 shows an MFP (i.e. output apparatus 60) in which a plurality of impact detectors are placed in key locations on or inside the output apparatus 60. In the example shown in FIG. 6, fourteen impact detectors are incorporated into output apparatus 60, although any number of impact detectors may be used in various locations. Impact detectors 601, 602, 603 and 604 are each disposed on a front panel of a feed tray of the output apparatus 60, and are configured to detect impact to the feed tray, such as a violent drawer operation. Impact detectors 605 and 606 are disposed on a lower side of the output apparatus 60 to detect impacts such as a frustrated user's kicking, or impacts to external equipment. Impact detector 607 is disposed on an operational panel and may be configured to detect impact to an operational panel, such as hand action by a frustrated end user. Impact detector 608 is located on a display panel, and may detect impact to any fragile components on the display panel. Impact detector 609 may be disposed on a document feeder and may be utilized to detect violent openings or closings of the document feeder, and impact detectors 610 and 611 may be disposed on respective upper sides of the output apparatus 60 and are configured to detect external equipment impacts on such upper sides.

Impact detector 612 may be disposed on an upper front location on the output apparatus 60, and is configured to detect impacts to external equipment in such area. Impact detector 613 may be disposed in a toner area (i.e. consumables area), and configured to detect impact such as violent toner container operation in such area. Impact detector 614 may be disposed in an area where apparatus controller 102 is located, and impact detector 614 may be configured to detect possible impacts to fragile components of the apparatus controller 102. It should be noted that these impact detectors are merely exemplary and the location and function of the impact detectors are not limited to what is shown in FIG. 6. The actual placement can vary depending on the output device type and the number of impacts that are desired to be detected, and additional impact detectors to measure various other impacts may be included.

The impact detector 103, 104, 105 may only consider an impact to be an impact event if the impact exceeds the minimum impact criteria. Thus, the impact detector may output impact data to the apparatus controller 102 only if such minimum impact criteria is exceeded. If the impact does not meet the minimum impact criteria, the impact detector 103, 104, 105 may consider the impact not to be an impact event, and therefore the impact data will not be outputted to the apparatus controller 102.

Further, apparatus controller 102 may set one minimum impact criteria (i.e. the specified amount of acceleration change over a predetermined amount of time) on one impact detector and another, different minimum impact criteria on another impact detector. Thus, the minimum impact criteria for each component of output apparatus 10A can be customized to correspond to an allowable threshold of impact. For example, an impact detector located at a portion of the output device that has fragile, expensive components may have a relatively low minimum impact criteria to protect such components. On the other hand, an impact detector disposed at a sturdier, commonly used portion of the output device may have a relatively high minimum impact criteria such that only excessive impacts are of any consequence.

FIG. 7 illustrates a table of information that may be included in impact reports (i.e. impact report 1, impact report 2, and impact report 3 of FIG. 7), according to an exemplary embodiment.

As shown in FIG. 7, impact report 1 relates to an impact event of "Feed tray closed violently", which occurred at 9:00:01 AM. Since the malfunction here preceded the impact, it can be determined that the user reacted to the malfunction by letting out frustration on the feed tray (i.e. at 601-604 of FIG. 6). In impact report 2, which occurred at 10:15:40 AM, impact to fragile components at the operational panel (i.e. at 607 in FIG. 6) was detected, and since the malfunction did not precede the impact, it can be determined that the user caused the malfunction via the impact. In impact report 3, impact was detected at the display panel (i.e. at 608 of FIG. 6) at 3:05:11 PM, although it is determined that no malfunction occurred as a result of the impact and no malfunction existed prior to the impact.

If the apparatus controller 102 receives multiple impact reports from multiple impact detectors 103, 104, 105 for one impact event, the apparatus controller 102 may reconcile such impact reports from the multiple impact detectors 103, 104, 105 to determine a primary point of impact, and a direction and magnitude of impact. In this way, even if multiple impacts occur at the same time, the apparatus controller is still able to discern where the most significant impact occurred, and thus where the most likely area to be damaged is located. The apparatus controller 102 may recognize that such multiple impact reports are part of the same impact event based on a timestamp of each impact report. The impact assessment device 207 may perform analysis on the multiple impact reports to provide additional correlation and reporting capabilities.

For example, FIG. 8 illustrates a table of information included in one or more impact reports (i.e. impact report 4, impact report 5 and impact report 6 of FIG. 8), according to an exemplary embodiment.

In this case, the apparatus controller 102 has received impact reports from multiple impact detectors, and the apparatus controller 102 may reconcile these impact reports as a single impact event given how close in time each occurred. More specifically, since the feed tray (i.e. 601-604 of FIG. 6) was closed violently at 9:05:33 AM, and 3 seconds later at 9:05:36 AM impact to the lower side (i.e. 605 of FIG. 6) was detected, the apparatus controller 102 may determine that in the user violently pushed in the feed tray and then, 3 seconds thereafter, kicked the lower side of the feed tray. Further, as impact was detected at the upper front location at 9:05:38, this may be considered part of the same impact event, as the user may have violently contacted the upper front location (i.e. at 612 in FIG. 6) after kicking the lower side of the output apparatus. The apparatus controller 102 may reconcile these impacts to determine a primary point of impact, and direction and magnitude of the impact. In addition, since the malfunction here preceded the impact, it can be determined that the user frustration was in response to the malfunction, meaning that the user frustration likely did not cause the malfunction.

Figure 9:
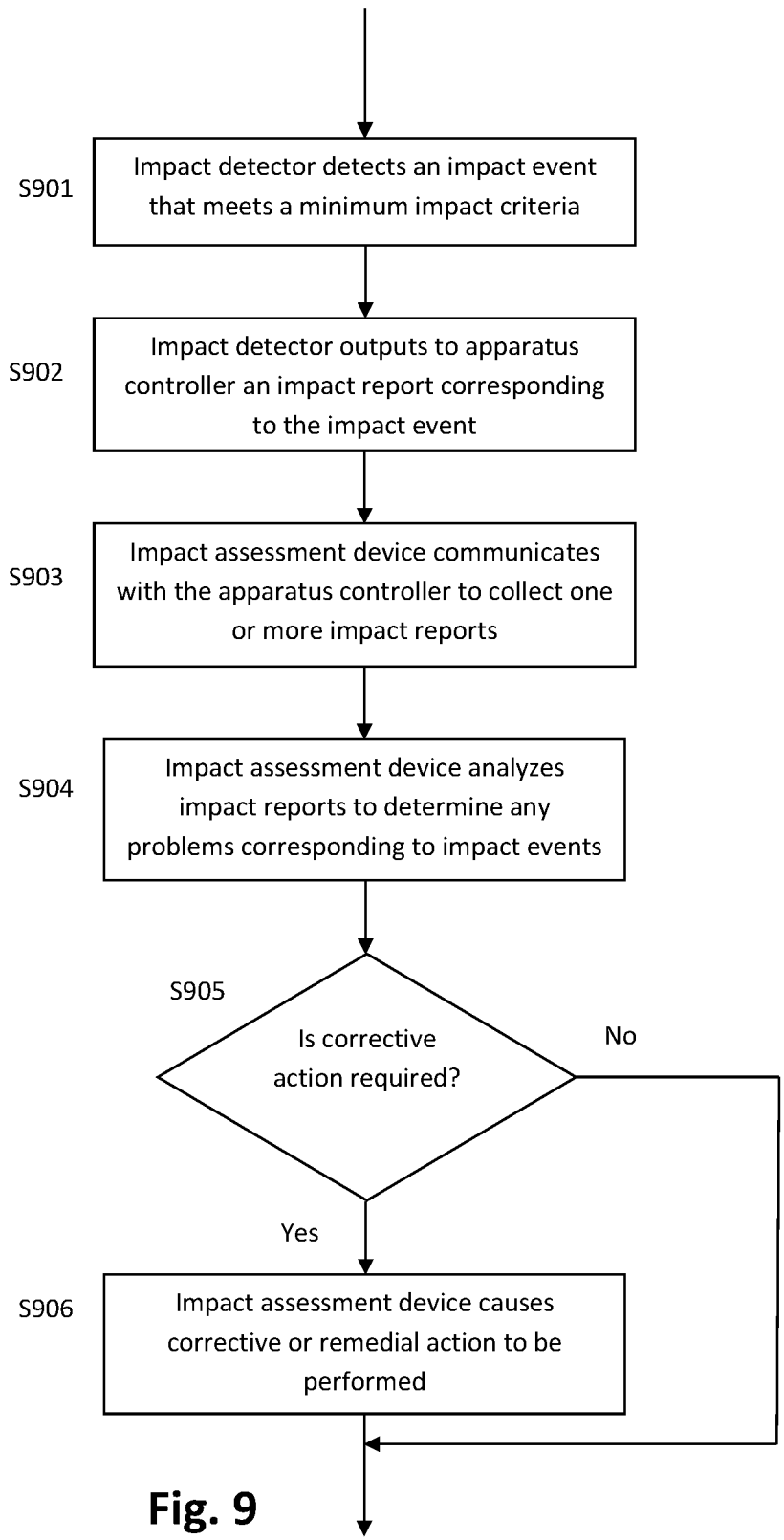
FIG. 9 shows a flow chart of a method for assessing impact to an output apparatus in any of the systems of FIGS. 2A and 2B (or an equivalent)

FIG. 9 shows a process for assessing impact to an output apparatus (i.e. output apparatus 10) that provides printing services, such as illustrated in FIGS. 2A and 2B, according to an exemplary embodiment.

An impact event is detected when (i) a change in acceleration of one or more impact detectors 103, 104, 105, disposed within or on a housing of output apparatus 10B is detected and when (ii) a minimum impact criteria including a specified amount of acceleration change over a predetermined amount of time (step S901). After one or more impact events are detected, the impact detector 103, 104, 105 outputs to apparatus controller 102 an impact report including impact time and impact data corresponding to the impact event (step S902). Thereafter, the impact assessment device 207 communicates with the apparatus controller 102 of the output apparatus 10B to collect the one or more impact reports obtained by the apparatus controller 102 from the impact detectors 103, 104, 105 (step S903).

The impact assessment device then performs an analysis of the collected impact reports to determine one or more existing prospective problems corresponding to impact events reported in the impact reports. (step S905). If it is determined that corrective or remedial actions are necessary, such actions are performed (step S906; Yes). The corrective or remedial actions may include immediately communicating an alert to a device administrator or maintenance service to cause the corrective action to be performed. In a case where it is determined that corrective or remedial actions are not necessary, such actions are not performed (step S905; No).

The impact report may also include impact time and data corresponding to an impact shock to the output apparatus 10B that exceeds a predetermined impact threshold. When such a large impact shock is detected, an alert may be communicated immediately, via an Simple Network Management Protocol (SNMP) trap or the like, to cause corrective action to be performed.

In another aspect, when a report of malfunction of an apparatus unit or apparatus part of the output apparatus 10B is received, the malfunction report may be compared to impact reports detailing impact events at the apparatus unit or apparatus part. In this case, it may be determined whether the malfunction preceded the impact events at the apparatus unit or apparatus part, or whether the impact events preceded the malfunction. Thus, the cause of a problem with output apparatus 10B may be readily identified.

In a case where it is determined that a reported malfunction of an apparatus part of output apparatus 10B can be attributed to one or more reported impact events at the apparatus part, a notification to request that the apparatus part be replaced may be transmitted. Further, it may be determined that a paper jam history of a paper tray (i.e. at impact detectors 601, 602, 603, 604 of FIG. 6) of the output apparatus 10B is attributed to one or more impact reports reporting impact events at the paper tray. Thus, a notification that the paper tray needs to be replaced may be transmitted.

In a case where it is determined that a number of reported impact events at the output apparatus over a predetermined amount of time preceding such determination exceeds a threshold number, a message may be output to a user of the output apparatus 10B requesting the user to report the apparatus malfunction to a specified service contact. In this way, users of the output apparatus 10B may notify an administrator of a problem that may have been caused by repeated impact events.

Figure 10:
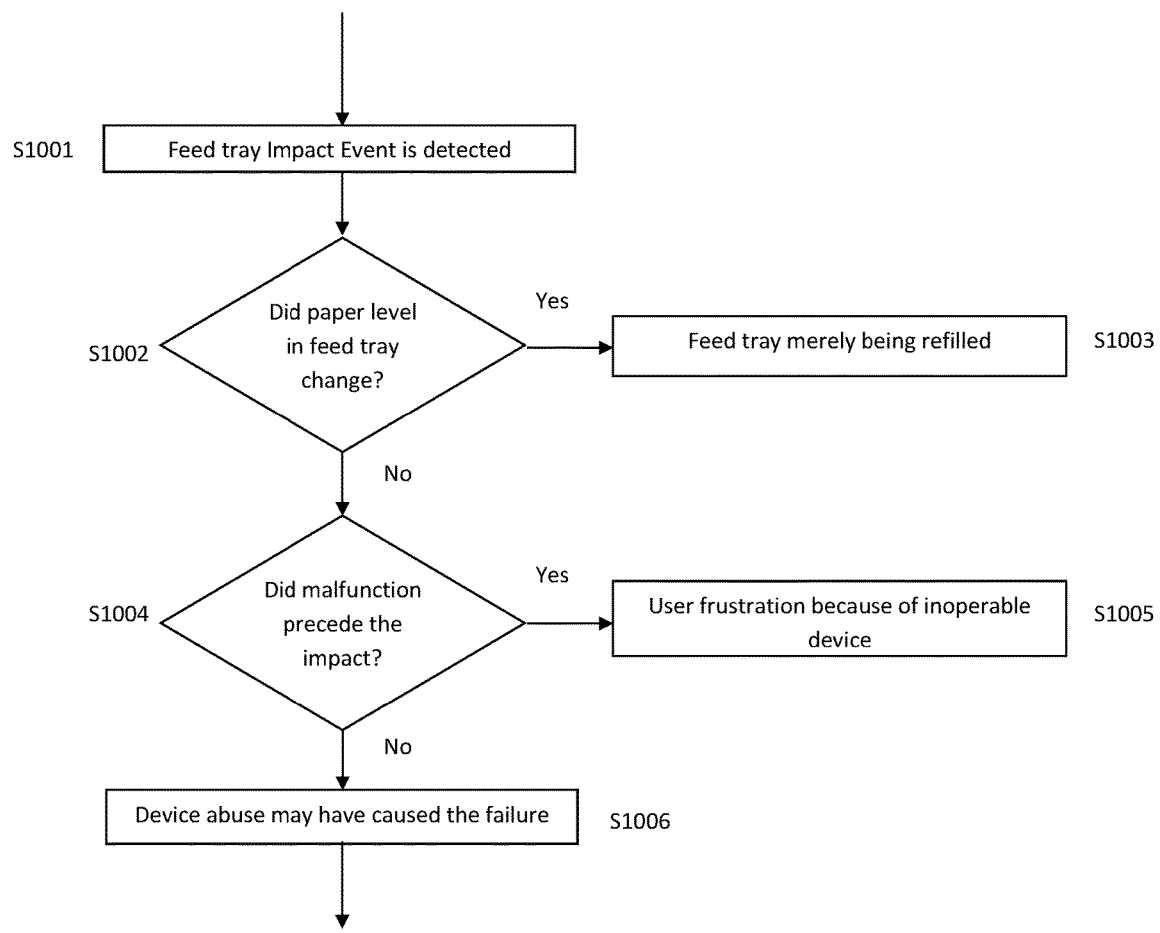
FIG. 10 shows a flow chart of a method that can be performed in any of the systems of FIGS. 2A and 2B (or an equivalent)

Turning now to FIG. 10, there is shown a flowchart of a method of impact data analysis performed by the impact assessment device 207, such as illustrated in FIGS. 2A and 2B, according to an exemplary embodiment.

When an impact is made at the feed tray (i.e. at 601-604 of FIG. 6), a feed tray impact event is detected (step S1001). It is then determined whether the paper level in the paper tray changed (step S1002). If the paper tray level did change, it may be determined that the feed tray was merely being refilled and then pushed back in (step S1003, Yes). However, if the paper level in the paper tray did not change (step S1004, No), then further analysis is required to correlate impact events with device malfunctions. Impact assessment device 207 then determines whether there was a malfunction, and if so, determines whether the malfunction of the paper tray preceded the impact (step S1004). If the malfunction did precede the impact, it is determined that the user let his or her frustration out on the paper tray because it was inoperable (step S1005, Yes). On the other hand, if it is determined that the impact preceded the malfunction, it is determined that the user likely caused the device failure with the impact (step S1006, No).

Figure 11:
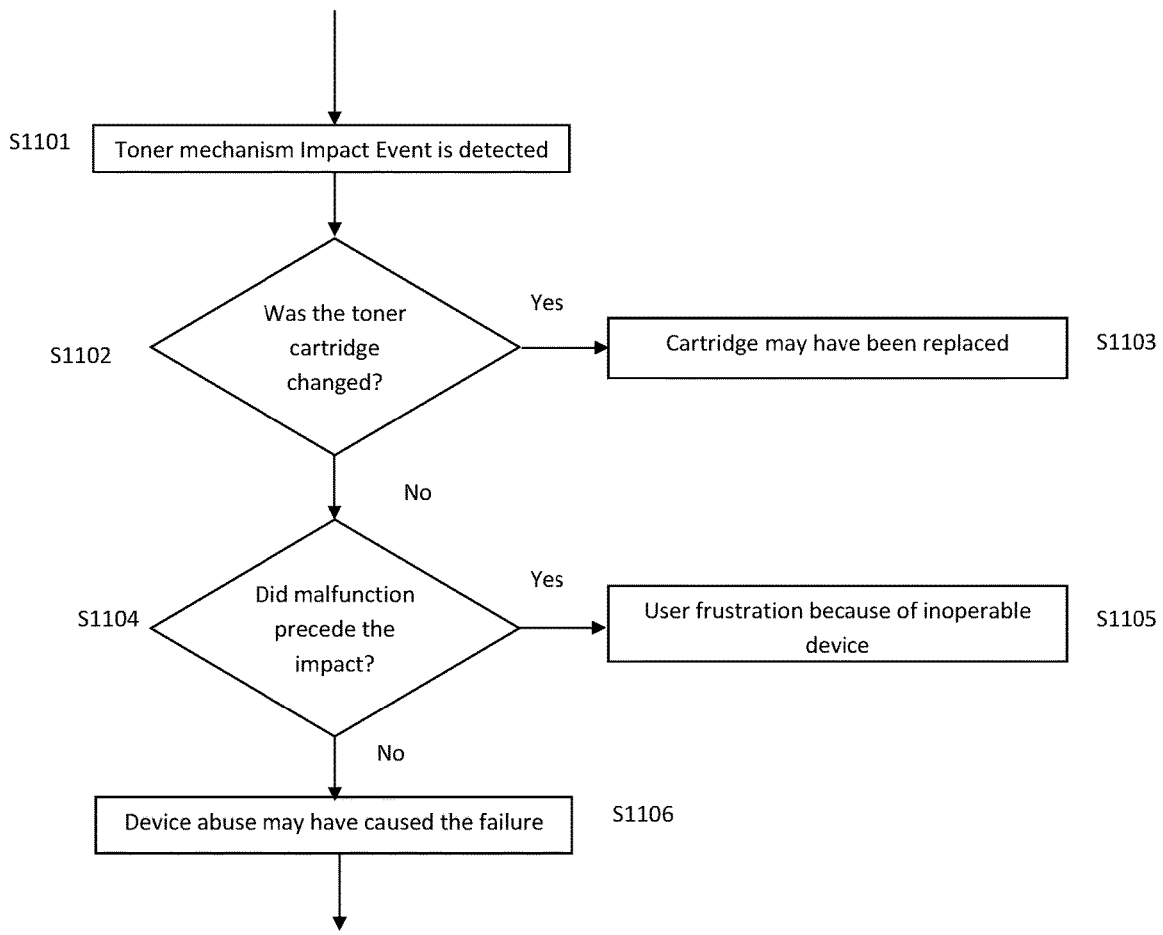
FIG. 11 shows a flow chart of a method that can be performed in any of the systems of FIGS. 2A and 2B (or an equivalent)

As illustrated in FIG. 11, a similar analysis is performed with regards to the toner area, according to an exemplary embodiment. If the impact detector at the toner mechanism (i.e. 613 in FIG. 6) detects an impact event, the impact assessment device 207 determines whether the toner cartridge was changed (step S1102). If yes, it is determined that the cartridge may have been replaced (step S1103, Yes). However, if the toner cartridge was not changed (step S1102), this suggests that there may be a malfunction as a result of the impact. It is then determined if the malfunction preceded the impact (step S1104). If the malfunction did in fact precede the impact, it is likely that any user frustration was a result of the inoperability of the toner (step S1105, Yes). On the other hand, if the impact preceded the malfunction, this suggests that the device abuse caused by the impact may have caused the toner mechanism failure (step S1106). Further, the impact may be noted by multiple detectors, or there may be repeated impacts within a short time frame.

Figure 12:
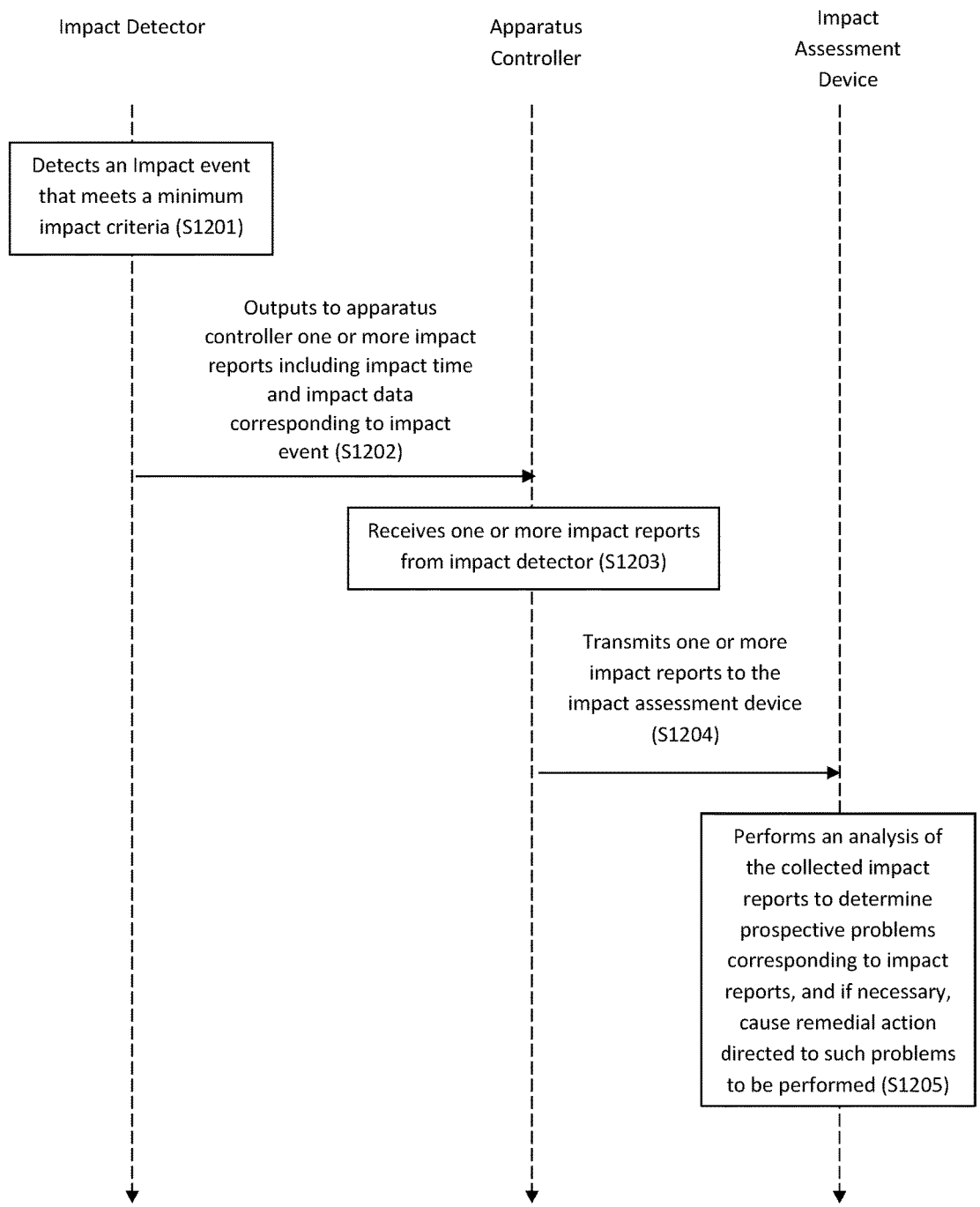
FIG. 12 illustrates a schematic diagram demonstrating a typical workflow, such as in any of the systems of FIGS. 2A and 2B (or an equivalent).

In FIG. 12, there is shown a schematic diagram of a data flow in a system, such as system 200A and/or 200B illustrated in FIGS. 2A and 2B, respectively, according to an exemplary embodiment.

In S1201, an impact event that meets a minimum impact criteria is detected by the impact detector 103, 104, 105. In S1202, the impact detector 103, 104, 105 outputs to the apparatus controller 102 an impact report which includes at least impact time and impact data corresponding to the impact event. In S1203, the apparatus controller 102 receives the impact report from the impact detector 103, 104, 105, and transmits the one or more impact reports to the impact assessment device 207 (S1204). In S1205, the impact assessment device 207 receives the one or more impact reports from the apparatus controller 102, and performs an analysis of the collected impact reports to determine one or more prospective problems corresponding to the impact events reported in the impact reports. Thereafter, the impact assessment device determines whether any corrective or remedial actions directed to said problems are necessary, and if so, causes such corrective or remedial actions directed to said problems to be performed.

An example including many of the aspects discussed supra will now be discussed. In such example, impact detectors including accelerometers are disposed on or inside the output device in order to identify user actions and environmental impacts, and such information gathered by the impact detectors can then be used by a device management server (e.g., 201) to identify issues with the device, whether relating to problems within the device impacting the user, or user actions possibly affecting the operation of the device.

A provision in the example is to detect impacts on the output device by end users or other environmental actors (such as other staff, equipment or furniture) and to allow the collection and analysis of the data and correlation with device status and problems. Device impact detection can be performed using an impact detector, such as any one or more of an accelerometer, gyro or a similar device. The impact detectors may be disposed in multiple points on or in the output device, and connected to the output device controller using a data connection such as USB, serial, Ethernet or other similar data communication interface. In addition to the core accelerometer (or similar) function, the impact detector can also incorporate a real-time clock, off-line capability through the incorporation of a battery (optionally rechargeable, charged from the output device power supply), and a small amount of local persistent storage, such as flash memory. The impact detector can be configured to determine its status (on-line or off-line) based on whether communication with the output device controller is active. If the output device controller is responsive, the impact detector would consider itself to be on-line; otherwise, it would consider itself to be off-line.

The impact detector is configured to, from time to time, request from the output device controller the minimum impact criteria (based on acceleration and time), and the impact detector stores this information in its local persistent storage. The controller may choose to set different minimum criteria for different impact detectors on the output device. The output device controller is configured also to provide the current date and time to the impact detector, so as to keep the impact detector's local clock synchronized with that of the controller.

When the impact detector detects an impact, it compares the impact data to the minimum impact criteria. If the impact exceeds the minimum criteria, the impact detector proceeds to send the impact data (e.g., maximum impact, acceleration pattern along each axis, and the time stamp) to the controller using its data connection. Impacts smaller than the minimum criteria are ignored.

If the impact detector is in off-line operation when it detects an impact, it nevertheless compares it to the minimum impact criteria. If the impact exceeds the minimum criteria, the impact detector proceeds to store the impact data (e.g., maximum impact, acceleration pattern along each axis, and the time stamp) in its local persistent storage. Once it returns to on-line state, it then sends the data for all the impacts detected in off-line mode, to the controller using its data connection.

Within an output device, impact detectors can be placed in key locations on or inside the output device. The actual placement can vary depending on the output device type and the types and locations of impacts that are desirably detected. For example, the set of impact detectors provided in or on the output device may include any of (but are not limited to) the following:

Paper drawer impact detection (to detect violent drawer operation);

Lower side impact detection (to detect frustrated end user kicking action. or external equipment impacts);

Front panel impact detection (to detect frustrated end user hand action);

Display panel impact detection (to detect possible impact to fragile components);

Document feeder impact detection (to detect violent openings or closings of the document feeder);

Upper side impact detection (to detect external equipment impacts);

Upper front impact detection (to detect external equipment impacts);

Toner area impact detection (to detect violent toner container operation);

Controller impact detection (to detect possible impact to fragile components).

If the output device controller has received impact data reports from multiple impact detectors for the same impact event (based on the timestamp of each data report), the data from the multiple detectors can be combined in order to determine the primary point of impact, the direction and magnitude of the impact, as well as the level of impact to any sensitive components. After impact correlation, if it is required, the output device controller stores the impact data in its own persistent storage, in an impact log.

While the output device controller is configured to collect the data from multiple impact detectors, the analysis may be performed by a device management server (e.g., 201), which will be able to provide additional correlation, analysis and reporting capabilities. From time to time, whether on demand, or on a scheduled basis, the device management server can establish a connection (e.g., SNMP, HTTP or some other similar protocol) to each output device (controller), and request the data for any impacts stored by the output device controller. Optionally, the device management server may request the output device controller to delete the impact data once it has been received by the device management server.

Should the output device controller receive information from one or more output detectors regarding a shock exceeding a predetermined threshold, the output device controller proceeds to notify the device management server immediately of such significant event, such as by using a mechanism such as an SNMP trap. Once the device management server has been notified of such a significant impact, it proceeds to contact the output device (controller) to retrieve data pertaining to the impact. Based on administrator-configured rules, the device management server may then choose to send an alert (by email, SMS, voice message or some other messaging system) to the system administrator, or to the manufacturer or dealer who supplied the output device, or another, in order to trigger appropriate action.

On the other hand, based on device management data and impact data, the device management server may identify a variety of situations, such as, for example, the following:
    User frustration: unusually many lower side or front panel impacts;
    User frustration: heavy impacts on the display panel;
    User frustration caused by paper jams: Paper jam events followed by lower side or front panel impacts;
    User frustration caused by document feeder jams: Document feeder jam events followed by document feeder impacts;
    Paper drawer malfunctions: Paper drawer impacts without a change in paper level, or repeated impacts before the paper level changes;
    Toner mechanism impacts: Toner area impacts without a change in the toner cartridge;
    Equipment impacts: Front or side impacts potentially causing damage.

In many instances, the impact may be noted by multiple sensors, and there may be repeated impacts within a short time frame. The device management server may perform analysis to identify such series of impact events, and also correlate those with device malfunctions. For example, device management server may determine whether the malfunction preceded the impacts (possible user frustration because of inoperable device, as an example), or whether the impact precede the malfunction (as an example of possible device abuse causing a device failure).

The aforementioned specific examples and embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

For example, the orders in which the steps are performed in the aforementioned methods are not limited to those shown in the examples of FIGS. 9, 10, 11 and 12, and may be switched as long as similar results are achieved. Also, it should be noted that the methods illustrated in the examples of FIGS. 9, 10, 11 and 12 may be implemented using any of the systems shown in FIGS. 1A, 1B, 2A and 2B (or equivalents thereof).

What is claimed is:

1. An output apparatus that includes a printer engine to form an image on a recording medium, the output apparatus further comprising:
    an apparatus controller to control operation of the output apparatus; and
    one or more impact detectors disposed within or on an apparatus housing to detect an impact event that meets a minimum impact criteria,
    each impact detector amongst the impact detectors including:
        a real-time clock to maintain current date and current time; and
        an acceleration detection unit to detect change in acceleration of the impact detector caused by sudden force applied to one or more points on the apparatus housing or on another part of the apparatus accessible from outside of the apparatus housing, wherein
    the minimum impact criteria includes a specified amount of acceleration change over a predetermined amount of time, and
    the impact detector outputs to the apparatus controller an impact report including impact time and impact data corresponding to the detected impact event.

2. The output apparatus as claimed in claim 1, wherein
    the impact detector further includes native persistent storage that captures and stores the impact time and impact data even when power is not supplied by a power supply of the output apparatus to the impact detector,
    the impact detector determines whether the impact detector is off-line in which the apparatus controller is not responsive to the impact detector, or the impact detector is on-line in which the apparatus controller is responsive to the impact detector, and
    when the impact occurs while the impact detector is off-line, the impact detector stores the impact time and impact data in the native persistent storage and then when the impact detector becomes on-line, the impact detector retrieves the stored impact time and impact data from the native persistent storage and generates and outputs the impact report to the apparatus controller.

3. The output apparatus as claimed in claim 1, wherein
    the impact detector further includes native persistent storage to store data and settings even when power is not supplied by a power supply of the output apparatus to the impact detector, and
    the minimum impact criteria is obtained by the impact detector from the apparatus controller upon request of the impact detector or by the apparatus controller pushing the minimum impact criteria onto the impact detector, and the impact detector stores the minimum impact criteria in the native persistent storage of the impact detector.

4. The output apparatus as claimed in claim 1, wherein the apparatus controller sets one minimum impact criteria on one impact detector and another different minimum impact criteria on another impact detector.

5. The output apparatus as claimed in claim 1, wherein when the impact detector detects an impact, the impact detector compares the impact to the minimum impact criteria set to the impact detector, and
- if the impact exceeds the minimum impact criteria, the impact detector outputs the impact data corresponding to the detected impact event to the apparatus controller, and
- if the impact does not meet the minimum impact criteria, the impact detector does not consider the impact to be an impact event.

6. The output apparatus as claimed in claim 1, wherein the impact detector further includes:
- a secondary battery that supplies power to the real-time clock and other components of the impact detector, when power is not supplied to the impact detector by a power supply of the output apparatus.

7. The output apparatus as claimed in claim 1, wherein when the impact detector is on-line in which the apparatus controller is responsive to the impact detector, the apparatus controller sets the date and time on the real-time clock of the impact detector.

8. The output apparatus as claimed in claim 1, wherein when the apparatus controller receives impact reports from multiple impact detectors for one impact event, the apparatus controller reconciles the impact reports from the multiple impact detectors to determine a primary point of impact, and direction and magnitude of the impact.

9. The output apparatus as claimed in claim 1, further comprising one or more of the following (i) through (v):
- (i) at least one impact detector disposed on a front panel of a feed tray of the output apparatus;
- (i) at least one impact detector disposed in or on a document feeder of the output apparatus;
- (iii) at least one impact detector disposed in or on an operational panel of the output apparatus to receive user input;
- (iv) at least one impact detector disposed in or on a display panel of the output apparatus;
- (v) at least one impact detector disposed in or on a door or cover of the output apparatus.

10. The output apparatus as claimed in claim 1, further comprising:
- a network interface through which the output apparatus is connected to a network to communicate with other devices connected to the network, wherein
- the apparatus controller collects the impact data and communicates the collected data through the network to an impact assessment device.

* * * * *